(12) United States Patent
Anderson et al.

(10) Patent No.: US 7,886,293 B2
(45) Date of Patent: Feb. 8, 2011

(54) OPTIMIZING SYSTEM BEHAVIOR IN A VIRTUAL MACHINE ENVIRONMENT

(75) Inventors: Andrew V. Anderson, Hillsboro, OR (US); Steven M. Bennett, Hillsboro, OR (US); Erik C. Cota-Robles, Portland, OR (US); Stalinselvaraj Jeyasingh, Beaverton, OR (US); Alain Kägi, Portland, OR (US); Michael A. Goldsmith, Lake Oswego, OR (US); Sebastian Schoenberg, Hillsboro, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1422 days.

(21) Appl. No.: 10/886,422

(22) Filed: Jul. 7, 2004

(65) Prior Publication Data

US 2006/0010440 A1    Jan. 12, 2006

(51) Int. Cl.
*G06F 9/455* (2006.01)
(52) U.S. Cl. ......................................................... 718/1
(58) Field of Classification Search ...................... 718/1
See application file for complete search history.

(56) References Cited

U.S. PATENT DOCUMENTS

| | | | |
|---|---|---|---|
| 5,511,198 A | * | 4/1996 | Hotta ........................... 717/156 |
| 7,076,647 B2 | * | 7/2006 | Roth et al. ................... 713/100 |
| 2003/0037089 A1 | | 2/2003 | Cota-Robles et al. ....... 109/102 |
| 2003/0084346 A1 | | 5/2003 | Kozuch et al. ............... 713/201 |
| 2003/0163723 A1 | | 8/2003 | Kozuch et al. ............... 713/200 |
| 2003/0188165 A1 | | 10/2003 | Sutton, II et al. ............. 713/176 |
| 2004/0003321 A1 | | 1/2004 | Glew et al. ..................... 714/27 |
| 2004/0003323 A1 | | 1/2004 | Bennett et al. ................. 714/36 |
| 2004/0003324 A1 | | 1/2004 | Uhlig et al. .................... 714/38 |
| 2005/0076324 A1 | * | 4/2005 | Lowell et al. ................ 717/100 |
| 2005/0080753 A1 | * | 4/2005 | Vega et al. ..................... 706/21 |
| 2005/0091354 A1 | * | 4/2005 | Lowell et al. ................ 709/223 |
| 2005/0091365 A1 | * | 4/2005 | Lowell et al. ................ 709/224 |
| 2005/0188374 A1 | * | 8/2005 | Magenheimer ............. 718/100 |

OTHER PUBLICATIONS

U.S. Appl. No. 09/752,134, Neiger et al., filed Dec. 27, 2000.

* cited by examiner

*Primary Examiner*—Li B Zhen
*Assistant Examiner*—Mengyao Zhe
(74) *Attorney, Agent, or Firm*—Trop, Pruner & Hu, P.C.

(57) ABSTRACT

In one embodiment, the present invention includes a method of transitioning control to guest software in a virtual machine from a virtual machine monitor, receiving control following a transition from the virtual machine to the virtual machine monitor upon an event, and determining whether to modify a state of the guest code, a state of the virtual machine monitor or a state of controls. If such a determination is made, the state may be modified and control is transitioned back to the guest software.

25 Claims, 4 Drawing Sheets

OPTIMIZING SYSTEM BEHAVIOR IN A VIRTUAL MACHINE ENVIRONMENT

BACKGROUND

The present invention relates to optimizing system behavior, and more specifically to optimizing such behavior in a virtual machine environment.

A virtual machine monitor (VMM) typically runs on a computer system and presents to other software the abstraction of one or more virtual machines. Each virtual machine (VM) may function as a self-contained platform, running its own operating system and other software, collectively referred to as guest software (or simply a "guest"). The guest software is said to be hosted by the VMM and to be running in or on a VM. The guest software expects to operate as if it were running on a dedicated computer rather than a virtual machine. Accordingly, the guest software expects to control various events and have access to hardware resources, such as processor-resident resources (e.g., control registers), resources that reside in memory (e.g., descriptor tables) and resources that reside on the underlying hardware platform (e.g., input/output (I/O) devices). The events may include interrupts, exceptions, platform events (e.g., initialization (INIT) or system management interrupts (SMIs)), and the like.

In a virtual machine environment, the VMM generally has ultimate control over these events and hardware resources to provide proper operation of guest software and for protection from and between guest software running on different VMs. To achieve this isolation, the VMM typically receives control when guest software attempts to access a protected resource or when other events (such as interrupts or exceptions) occur. Attempts to access protected resources and events are referred to collectively as virtualization events.

A motivation for using a VMM is to run unmodified system software (i.e., the illusion provided by the VMM is such that existing system software can run as-is as if it were running on a hardware platform). Such an execution environment provides an opportunity for optimizing the overall system's performance, usability, robustness, or reliability. However, a need exists to improve execution of guest software in a virtual machine environment.

DETAILED DESCRIPTION

In various embodiments of the present invention, specific actions or events incurred by guest software may be detected, and the guest's (as well as the VMM's) behavior may be improved by implementing certain techniques. Such techniques may include modification of at least a portion of the guest software, a VMM controlling the guest software, data used or created thereby, state used to control the execution of the guest, state used to control transitions between the guest and VMM, and/or a state of the guest software. As used herein, the state of the guest software may include the contents of the guest's memory (including both code and data) or registers (e.g., general purpose registers, control registers, and machine specific registers), and other state, such as, for example, registers or memory of input/output (I/O) devices. In such manner, system performance, functionality, reliability, security, or correctness may be improved. Generally, embodiments may implement such activities via a technique referred to herein as "trap-and-modify".

Some embodiments of the present invention described herein use instructions and other architectural features that may be available in one or more specific processor instruction set architectures (ISAs). For example, some reference is made to the ISA of the Intel Pentium™ IV processor (hereafter referred to as the IA-32 ISA). This specificity in the discussion in no way limits the applicability of embodiments of the invention to systems using other processors or ISAs.

Trap-and-modify refers to a program action (i.e., a modifier program) on another program (i.e., a target program), where the former modifies the latter according to predetermined parameters or rules. The modifier may modify the target before the target starts executing or while the target is running. In other words, the modifier may modify the target program in its binary format while it is resident in system memory or before it is loaded to its final location in system memory. In certain embodiments the modification may be to the modifier program itself or to the state of the modifier program.

In certain embodiments, the modifications may be permanent. In other embodiments, the modifications may be transitory, and may be removed when an event triggers the modifier to undo or to redo the changes, or until the target program completes its execution or changes its state such that the modifications are no longer applicable. Modifications may be no longer applicable if, for example, the target program, which had previously been modified by the modifier, writes to the state that had been modified (i.e., overwriting the previously modified program code).

In the various embodiments of the present invention described herein, a virtual machine monitor acts as the modifier while software running in a virtual machine (i.e., guest software) acts as the target program.

In various embodiments, the actions of the modifier typically remain unobserved and unobservable by the target program. That is, the target program does not know, and may not be allowed to discover, that a modifier is running. The modifier's ability to enforce this unobservability may be limited by the capabilities of system on which the modifier and target are executing, as will be discussed further below.

To facilitate improved system performance, in various embodiments, the modifier may attempt to limit interactions with the target program by detecting a condition which can be optimized by receiving control following a fault event and making a modification to the target program in such a way that the faulting condition is removed or otherwise optimized. In this way, the cost of transitioning from the target to the modifier is reduced by avoiding the transition in all but the first occurrence.

Figure 1:
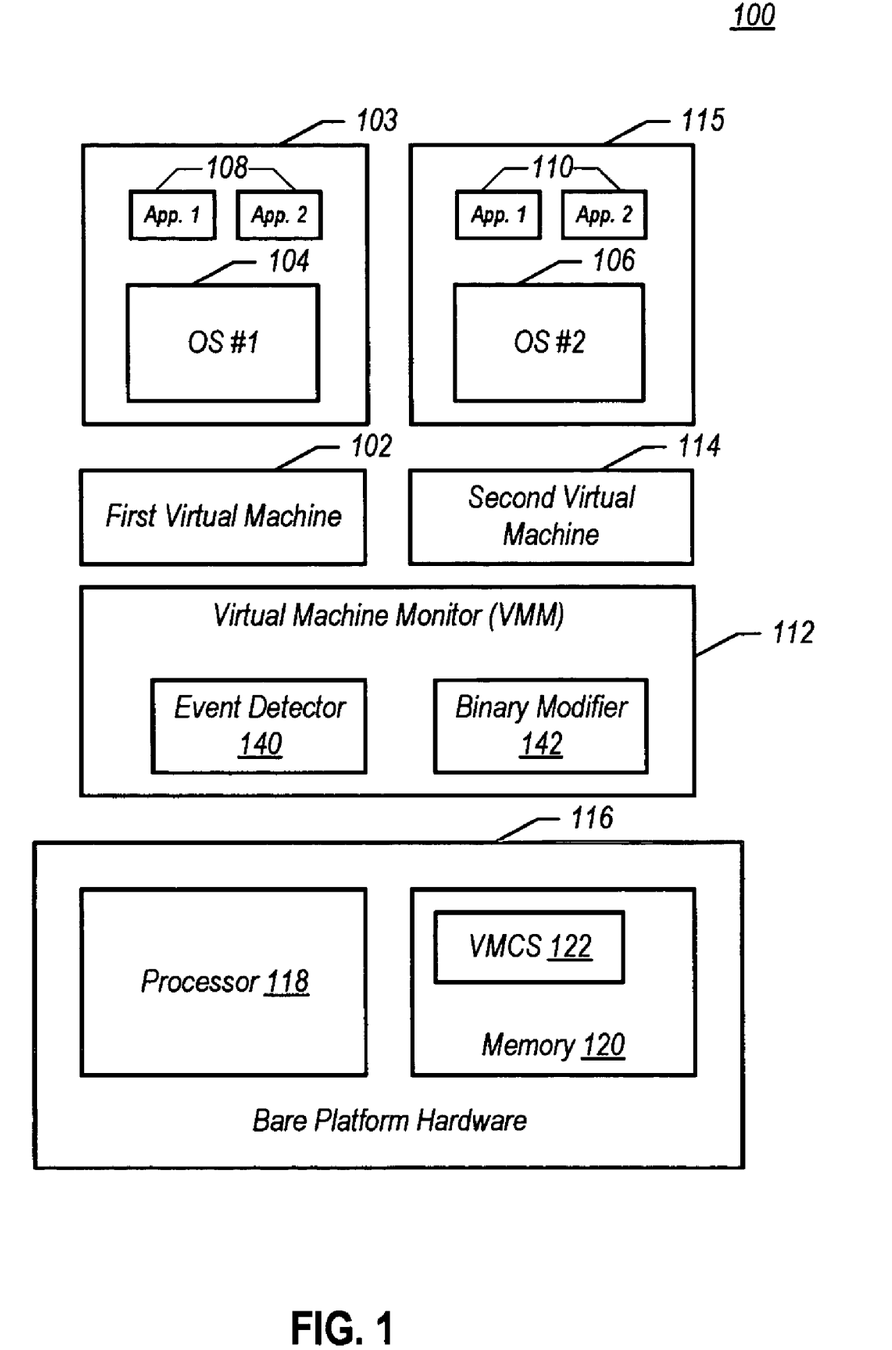
FIG. 1 is a block diagram of a system having a virtual machine environment in accordance with one embodiment of the present invention.

Referring now to FIG. 1, shown is a block diagram of a system having a virtual machine environment in accordance with one embodiment of the present invention. In the embodiment of FIG. 1, virtual machine environment 100 includes bare platform hardware 116 that may be a computing platform, such as any type of computer system, and which may execute a standard operating system (OS) or a virtual machine monitor (VMM), such as a VMM 112. VMM 112 may emulate and export a bare machine interface to higher level software. Such higher level software may be a standard or real-time OS, an operating environment with limited operating system functionality, or the like. Alternately, VMM 112 may be run within or on top of another VMM.

Platform hardware 116 may be of a personal computer (PC), mainframe, wireless device, portable computer, set-top box, or any other computing system. As shown in FIG. 1, platform hardware 116 includes a processor 118, memory 120 and may include other platform hardware (e.g., I/O devices) not shown in FIG. 1.

Processor 118 may be any type of processor capable of executing software, such as a microprocessor, digital signal processor, microcontroller, or the like. Processor 118 may include microcode, programmable logic or hardcoded logic for performing methods in accordance with embodiments of the present invention. Although FIG. 1 shows only one such processor 118, there may be one or more processors included in platform hardware 116.

Memory 120 may be a hard disk, a floppy disk, random access memory (RAM) such as dynamic RAM (DRAM), read only memory (ROM), flash memory, any combination of the above devices, or any other type of medium accessible by processor 118. Memory 120 may store instructions and/or data for performing embodiments of the present invention.

VMM 112 presents to other software (i.e., guest software) the abstraction of one or more virtual machines (VMs). VMM 112 may provide the same or different abstractions to the various guests. While FIG. 1 shows two such VMs 102 and 114, it is to be understood that more or less than 2 VMs may be supported by VMM 112. The guest software running on each VM may include a guest OS such as a guest OS 104 or 106 and various guest software applications 108 and 110. Collectively, guest OS and software applications are referred to herein as guest software 103 and 115.

Guest software 103 and 115 expect to access physical resources (e.g., processor registers, memory and I/O devices) within VMs 102 and 114 on which the guest software 103 and 115 is running. VMM 112 facilitates access to resources desired by guest software 103 and 115 while retaining ultimate control over resources within platform hardware 116. The resources that guest software 103 and 115 may attempt to access may either be classified as "privileged" or "non-privileged." For privileged resources, VMM 112 facilitates functionality desired by guest software 103 and 115 while retaining ultimate control over these privileged resources. Non-privileged resources do not need to be controlled by VMM 112 and can be accessed directly by guest software 103 and 115.

Further, guest software 103 and 115 expect to handle various fault events such as exceptions (e.g., page faults, general protection faults, traps, aborts, etc.), interrupts (e.g., hardware interrupts, software interrupts), and platform events (e.g., initialization (INIT) and system management interrupts (SMIs)). Some of these fault events are "privileged" because they are to be handled by VMM 112 to ensure proper operation of guest software 103 and 115 and for protection from and among guest software.

Collectively, attempts to access privileged resources and the occurrence of privileged events are referred to herein as virtualization events.

In one embodiment, criteria controlling a VM, including data to configure a VM, controlling the operation of the VM and controlling the transitions between the VM and the VMM 112 may be stored in one or more designated fields in a virtual machine control structure (VMCS) 122. For example, VMCS 122 may store the state of the guest software and information to control operation thereof. Different VMs may use data from different VMCS memory images, although only one such VMCS is shown for illustrative purposes in FIG. 1. VMCS 122 may reside in memory 120 and may be configured and maintained by the VMM 112 and accessed by processor 118. It is to be understood that any other data structure (e.g., an on-chip cache, a file, a lookup table, etc.) may be used to store the information stored in VMCS 122. Additionally, criteria controlling VM execution may be stored in areas other than a VMCS (e.g., in processor registers, in multiple memory locations, etc.).

Included in the data controlling the transitions between guest software 103 and 115 and VMM 112 is data referred to herein as execution controls, which indicate if the occurrence of particular virtualization events require action to be taken by VMM 112, and hence require a transfer of control from the VM to the VMM 112. In one embodiment, if the execution controls determine that a virtualization event encountered during execution of guest software (i.e., guest software 103 and 115) is to be handled by VMM 112, control is transferred to VMM 112. The transfer of control from the guest software to the VMM is referred to herein as a VM exit. VMM 112 may then handle the event and may transfer control back to guest software.

In one embodiment, the transfer of control from VMM 112 to the guest software 103 and 115 is achieved by executing a special instruction. The transfer of control from a VMM to guest software is referred to herein as a VM entry. This transfer of control may be facilitated using, for example, one or more instructions which instruct processor 118 to transfer control from the VMM to the VM. An initial VM entry to a guest may occur after VMCS 122 is appropriately configured (e.g., using one or more instruction provided by the processor) and loaded into processor 118 (e.g., using an instruction provided by the processor).

Privileged and non-privileged events that include exceptions, interrupts and platform events are referred to herein as faults. The term fault is used regardless of the semantics of the event with regard to the point at which the fault is detected; the detection may occur during or following execution of an instruction, prior to, during or following the delivery of an event, and the like. A fault may be generated by execution of an instruction on processor 118, or by events within processor 118 or external to it. For example, an instruction that accesses memory 120 may cause a variety of faults due to paging and segmentation protection mechanisms. An example of an externally generated fault is a hardware interrupt, generated by an I/O device.

In such manner, VMM 112 may obtain control when certain virtualization events occur while running in guest software. These virtualization events may include faults (e.g., interrupts, exceptions, platform events such as INIT, SMI and the like) or the execution of instructions which access privileged resources (e.g., move to/from control register, halt, move to/from debug register, cache and translation lookaside buffer (TLB) invalidate instructions, and the like).

Transitions to and from the guest software and the operation of the guest software in the VM may be controlled using a group of control vectors and state values (e.g., stored in the VMCS 122). As discussed above, in certain embodiments, the vectors may include execution control vectors that specify circumstances (i.e., virtualization events) which cause a transfer of control from the guest to the VMM. Further controls may include entry controls that control the saving of VMM state and the loading of guest state at VM entry, and exit controls that control the saving of guest state and the loading of VMM state at VM exit. Additionally, information describing the most recent VM exit may be provided in a group of exit information data fields.

A VMM may detect that a guest is taking certain actions (e.g., is executing a privileged instruction or is writing to a certain physical memory location). The VMM may control execution of the guest software using direct mechanisms (e.g., modifying the execution control vectors to cause VM exits when certain events occur or certain instructions are executed) or indirect mechanisms (e.g., marking certain guest page table entries invalid and causing VM exits on the page faults such modifications elicit when the guest accesses the protected memory). These guest software actions may cause a VM exit to the VMM.

The VMM may then inspect the guest software state and determine whether it must take steps to optimize system behavior(s), for example, according to some predetermined parameters. These optimizations of system behaviors may involve modifications of the guest state, or some other action, as will be described in detail below. If the VMM decides that modifications are not desired, it may simply resume the guest software (making sure that the guest software can make forward progress, e.g., emulating the action of the guest that caused the VM exit, if needed). On the other hand, if the VMM decides to apply a modification, it may modify the state of the guest software (including registers or physical memory, as required) and then resume the guest's execution. In addition to modifying the guest, in certain embodiments, modification may occur to the VMM itself, to data acted upon by the guest, or to data controlling the execution environment of the guest.

In certain embodiments, the VMM may detect situations which make the occurrence of an event of interest highly likely (but before the event actually occurs), allowing the VMM to modify behavior of the guest or VMM before the event happens to minimize the likelihood of the event occurring, to reduce the cost of the event or prevent the event from occurring at all.

Certain embodiments may be implemented in software and may include an event detector 140 and a binary modifier 142. As shown in FIG. 1, event detector 140 and binary modifier 142 may be implemented as part of VMM 112. The event detector 140 may detect the events that may trigger optimization actions (e.g., binary modification of the guest) by binary modifier 142. Event detector 140 may use a variety of mechanisms to facilitate detection. For example, event detector 140 may set one or more execution controls to effect a VM exit to the VMM when the guest performs certain operations which may require VMM intervention or may provide an opportunity to optimize system behavior. Alternatively, event detector 140 may modify the state of the guest to force a VM exit when desired. For instance, if event detector 140 is interested in detecting guest access to a range of addresses, event detector 140 may modify the guest's page table to force a page fault when the guest software accesses the addresses.

Certain embodiments may be implemented to leverage processor ISAs which have inherent support for virtual machines. Such ISAs provide the ability to execute guest software in a VM controlled by a VMM. In such embodiments, a variety of ISA features may be utilized by the event detector 140. For example, some ISAs provide a VMM with the ability to gain control due to exceptions during the execution of a VM. In some embodiments, an ISA may provide a bitmap allowing the VMM to specify which exceptions cause VM exits. Additionally, page fault exceptions may receive special handling, allowing a VMM to request VM exits only on a subset of all page faults (by, for example, analyzing an error code generated by the page fault in relation to criteria expressed by the VMM). Event detector 140 may use these facilities, for example, to gain control on page faults induced by modifications of the guest page tables made by the event detector 140, but not by other page faults caused by the guest's configuration of its page tables. Further, some ISAs may allow event detector 140 to specify that VM exits should occur on I/O operations, and may further allow a VMM to specify that VM exits should occur on a per I/O port basis. This feature allows event detector 140 fine granularity to gain control on guest accesses to some I/O ports, but not others, for example. Lastly, some ISAs may provide explicit means by which software executing in a VM may cause a VM exit through execution of a special instruction. This special instruction is referred to herein as VMCALL. Event detector 140 may use these facilities to virtualize I/O-based devices, as is discussed further below.

In various embodiments, binary modifier 142 may modify the state of the guest software. For example, the state may be modified according to pre-established rules. Certain specific example usages will be discussed below.

Figure 2:
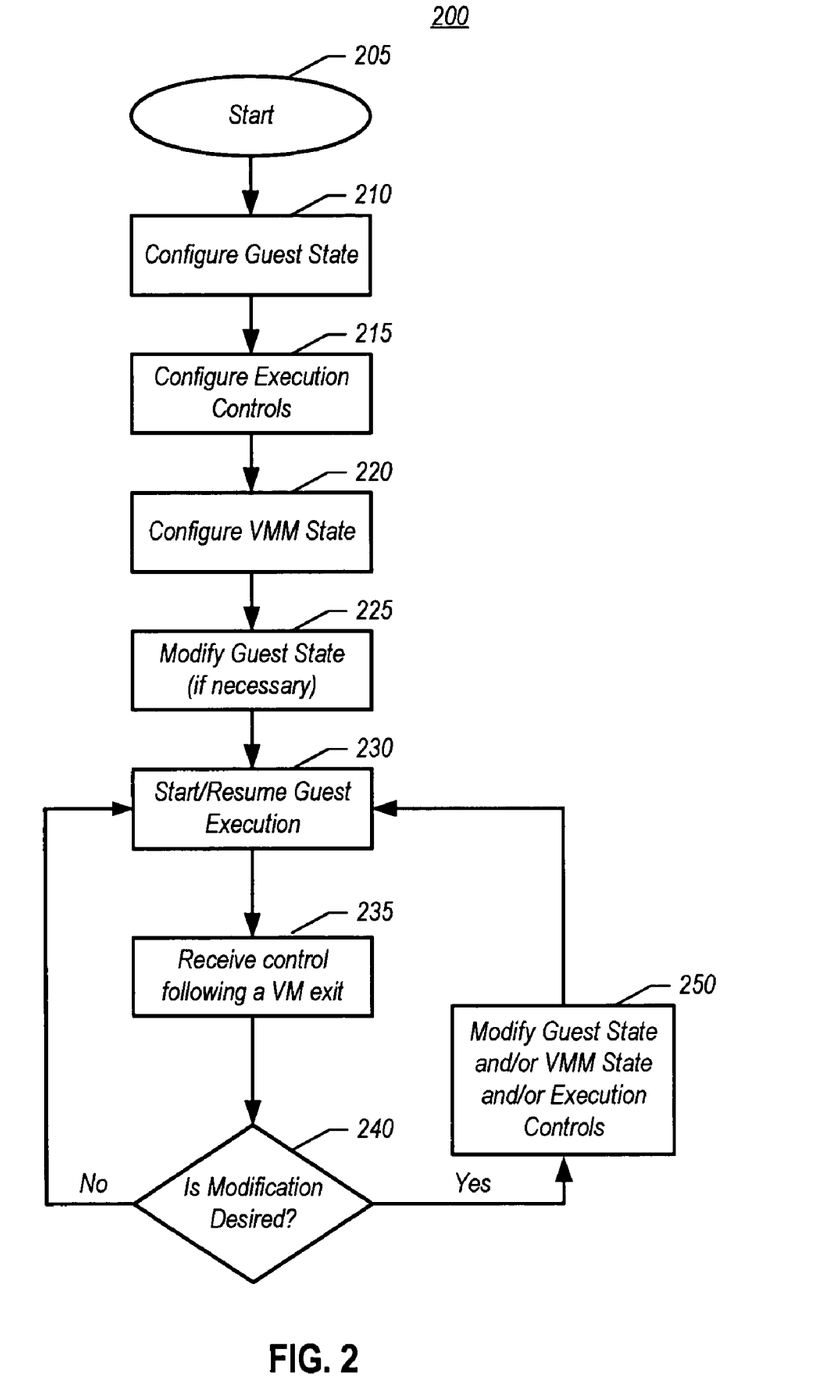
FIG. 2 is a flow diagram of a method of optimizing system behavior in accordance with one embodiment of the present invention.

Referring now to FIG. 2, shown is a flow diagram of a method in accordance with one embodiment of the present invention. Specifically, the flow diagram of FIG. 2 may be one method of implementing a trap-and-modify operation. The method may be implemented by a VMM, such as VMM 112 in FIG. 1. As shown in FIG. 2, method 200 may begin at a start point (oval 205).

The guest state may be configured (block 210). As discussed above, such a guest state may include values of registers, memory, etc. Some of the guest state may, in some embodiments, be stored in a VMCS.

A VMM may determine a set of events that it desires to detect in a guest. If these events may be detected using VM execution controls provided by the underlying processor's ISA, the VMM may program the execution controls for the guest appropriately. Execution controls may be then configured (block 215). In some embodiments, these execution controls are stored in a VMCS. For example, as discussed above, these execution controls may control state loading and storing during transitions between a VM executing the guest software and the VMM. Additionally, these execution controls may determine a set of events which, if they occur during execution of a guest, cause a VM exit.

At block 220, the VMM state may be configured. As discussed above, this VMM state may, in an embodiment, reside in the VMCS. This state may be loaded into processors registers or elsewhere as part of a VM exit.

Alternately, if the events that the VMM desires to detect can not be detected using available execution controls, the state of the guest may be modified appropriately to cause VM exits in appropriate situations (block 225). As discussed above, modifications to the guest state may include changing page table permissions and the like.

When finished configuring the controls and states, the VMM may start guest execution (block 230). At this point, control may be handed off to the VM for execution of the guest software (i.e., a VM entry occurs). As described above, in an embodiment, this transfer of control is facilitated by one or more instructions provided in the underlying processor ISA. In the course of execution, if the guest reaches a state that is desired to be detected, the processor, based on controls and states configured by the VMM, may cause a VM exit to the VMM. Thus control returns to the VMM (block 235).

Next, the VMM determines whether one or more modifications are desired to optimize system behavior (diamond 240). Such a determination may be based on predetermined parameters such as whether the guest code can be optimized, the cause of the VM exit, an analysis of the guest code at or surrounding the VM exit point and the like. Embodiments of this determination mechanism are described below.

If no such modification is desired control may return to block 230, where guest execution may resume. If instead one or more modifications are desired, the VMM may cause the guest state, execution controls and/or VMM state to be modified (block 250). Then control may return to the guest (i.e., through a VM entry) and execution in the guest may be resumed (block 230).

In certain embodiments, prior to resuming the guest's execution, the VMM may determine that it is no longer interested in detecting certain previously programmed events, or it is interested in new events. If so, the VMM may reconfigure the system accordingly (e.g., modifying execution controls, VMM algorithms, or guest state) and then permit the guest to resume execution.

While various trap-and-modify techniques may be performed in accordance with embodiments of the present invention, particular implementations for certain optimizations will be discussed. Of course, in other embodiments any desired guest software may be optimized and system behavior improved using the trap-and-modify techniques discussed herein.

One example optimization is an exit type transformation, in which an instruction or other virtualization event that causes a VM exit with a high-latency transition may be modified to cause a VM exit with a lower-latency transition. Depending on the source or specific conditions of a virtualization event (i.e., a cause of a VM exit), the latency of a resulting VM exit can vary greatly. For example, a VM exit due to a page fault may be much more expensive than a VM exit due to simple sources, such as execution of a VMCALL instruction.

An example of such a transformation is reducing VM exits due to page faults by modifying instructions which modify page table entries (PTEs) in the guest's page tables, and thus cause page fault VM exits when the VMM is utilizing certain methods for virtualizing physical memory. In this case, the guest code may be modified, replacing the PTE-modifying instruction with a VMCALL instruction. In the VMM, the instruction pointer (e.g., the EIP register in the IA-32 ISA) of the VMCALL may be used to determine if the instruction had been rewritten in this manner by, for example, referencing a VMM-maintained table or database of modified instructions in the guest. If so, the original instruction modifying the PTE (which was replaced with the VMCALL instruction) may be emulated in the VMM, and then control may be returned to the following instruction in the guest.

In some instances, a single instruction may be rewritten, as described above. In other instances, multiple instructions may be replaced with a sequence of instructions that determines if a VM exit is needed. For example, if a given instruction in the guest is used to write memory and may access page table pages and non-page table memory (depending on the arguments to the instruction), the guest code may be rewritten so that there are separate code paths for page table accesses and non-page table memory accesses. Then, only the instruction in the page table access path may be rewritten to cause a VM exit (for example, by replacing it with a VMCALL instruction).

To detect conditions under which the VMM disables any such binary modifications of guest software, the VMM may protect the modified pages of guest memory by marking them as read-only in the guest page tables. In this embodiment, if guest software attempts to write to such a page in memory, a page fault will occur, which the VMM can capture (using appropriate execution control settings).

In some embodiments, the VMM may take steps to assure that guest software cannot detect the changes to its state made by the VMM. For example, some embodiments may leverage a processor ISA which allows pages in the page tables to be marked execute-only. In such an ISA, data on pages marked execute-only may be neither read nor written, but the data bytes thereon may be interpreted by the processor as instructions. In such an embodiment, the VMM may mark the pages that it modifies as execute-only, which prevents guest software from detecting the changes. In this case, if the guest software attempts to read such execute-only pages, a page fault will occur, which the VMM can capture (using appropriate execution control settings). Having received a VM exit due to such an access, the VMM may determine if the source of the VM exit (i.e., the page fault) was induced by the changes made to the guest's page tables. If the fault was not induced, the VMM can facilitate the delivery of the fault to the guest; otherwise, it may emulate the reading of the execute-only page to return the expected (i.e., pre-modification) data to the guest software.

If the guest attempts to write to memory residing on such a read-only or execute-only page in guest memory, the VMM may disable the binary modification by restoring the instructions and/or data that were overwritten as part of the binary modification. The VMM may then remove guest access restriction on the page and allow the guest to continue execution (i.e., again executing the instruction which caused the page fault initially). Note that multiple binary modifications may be on each page of guest memory, so in some embodiments, extensions of this disablement mechanism may be implemented.

In one embodiment, rewriting of guest software may ensure that only a small set of instructions is used to replace VM exit-causing guest instructions, simplifying emulation of VM exit-causing instructions in the VMM. For example, the modifier may ensure that instructions causing VM exits due to page faults use only a subset of the underlying ISA's memory addressing modes, easing emulation. A specific example of this form of rewriting is discussed below.

Other embodiments may be used to modify guest software to facilitate graphics virtualization. In virtualization of one class of graphics devices, typically two kinds of VM exits dominate the virtualization workload: graphics translation table (GTT) updates and ring buffer tail pointer (RBTP) updates. Both the GTT and RBTP reside in memory-mapped I/O space, meaning that access to these entities is controlled by the guest page tables. Hence the VMM configures the VM execution environment to cause VM exits on accesses to the GTT and RBTP, as described above (i.e., by modifying the guest page tables).

To facilitate efficient emulation of the GTT and RBTP accessing operations, the VMM may modify the instructions leading up to the GTT and RBTP writes so that the instruction that causes a VM exit is a simple, known operation. For example, the VMM may assure that all such writes to memory are done using only a single, simple memory operand format (e.g., a register-direct memory addressing mode). When the instructions accessing the GTT and RBTP execute, they cause a VM exit due to a page fault in the (VMM-modified) guest page tables. Because the instruction causing this VM exit is a known, simple instruction, it can be emulated easily without using a full ISA emulator in the VMM. This technique may improve system performance, while reducing VMM implementation and validation complexity.

Additionally, as discussed above, it may be possible to improve performance by changing the page-faulting instruction (which causes an expensive VM exit transition) to a different instruction, causing a VM exit with reduced latency (e.g., a VMCALL).

Figure 3:
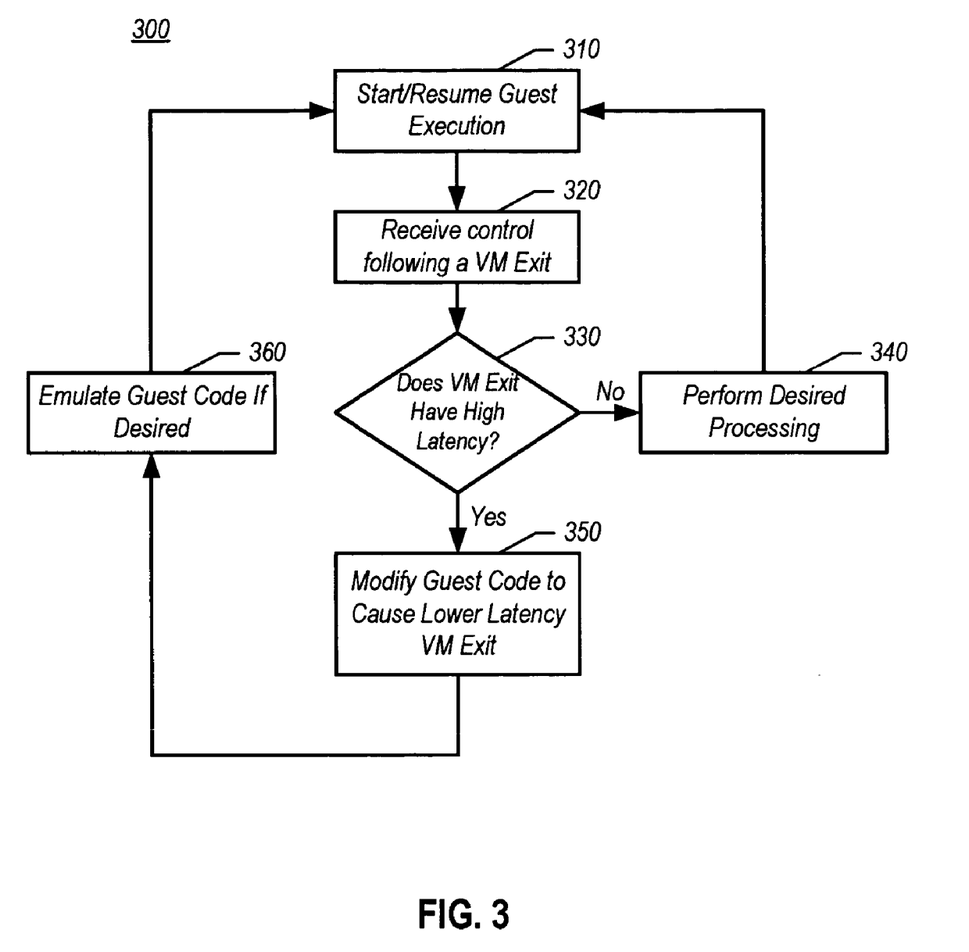
FIG. 3 is a flow diagram of a method of modifying software in accordance with an embodiment of the present invention.

Referring now to FIG. 3, shown is a flow diagram of a method of optimizing system behavior in accordance with an embodiment of the present invention. The method may be implemented by a VMM, such as VMM 112 in FIG. 1. As shown in FIG. 3, method 300 may be used to perform an exit type transform.

Specifically, method 300 may begin by initiating execution of guest software in a VM (block 310). Of course, various execution controls and other parameters may be modified prior to beginning guest execution. During execution of the guest software, a virtualization event causes a VM exit. Control is returned to the VMM following such a VM exit (block 320). Then it may be determined, by the VMM, whether the VM exit has a high latency (diamond 330). While what may be considered a high latency may vary in different embodiments, in certain embodiments a high latency may be a delay that is greater than other latencies that occur upon other types of VM exits. If it is determined that no such high latency VM exit has occurred, any desired processing to handle the VM exit within the VMM may be performed (block 340). Then control may return to the guest for resumption of execution (block 310).

Alternately, if it is determined that a high latency VM exit has occurred, the state of the guest may be modified to cause a lower latency VM exit (block 350). For example, a different instruction may be written in the guest code (after reading and storing the instruction(s) that were originally there) to cause a VM exit to occur with a lower latency than the original instruction. Then at block 360, certain guest code may be emulated, if desired. For example, instructions modifying page tables may be emulated in the VMM, and then control may return to block 310, where the execution of guest software may resume.

In some embodiments, the VMM may evaluate the cause of the VM exit to determine if it was caused by an instruction sequence rewritten by the VMM. This may be necessary if the VM exit may also occur due to unmodified guest software. For example, if the guest software is using the VMCALL instruction to communicate with the VMM, the guest software may generate VM exits due to VMCALL independent of VMM modifications to guest software to insert VMCALL instructions. To this end, in some embodiments, the VMM may maintain a data structure (e.g., a lookup table or database) which enumerates the locations in the guest software that the VMM has modified, and the details of such modifications. On the occurrence of such a VM exit, the VMM can reference this tracking data structure to determine if the source of the VM exit is guest software that the VMM has modified, and therefore requires special handling by the VMM. The additional information in the tracking data structure containing the details of the modifications allows the VMM to properly emulate the pre-modification behavior of the guest software.

In other embodiments, aggregating VM exit-causing instructions may be employed in conjunction with emulation to improve performance. Consider a scenario in which emulating a large sequence of instructions in the VMM is either undesirable due to the additional checks that must be made to ensure system integrity, or because necessary instructions are not supported in the VMM. In these cases, guest code may be rewritten so that VM exit-causing instructions are adjacent (or nearly so). In some cases, various control paths may be expanded, or speculative computation of conditionally needed values may be performed.

Having multiple VM exit-causing instructions close together in the instruction flow facilitates emulation of the entire code sequence from the first such VM exit-causing instruction to the last, avoiding performance overheads that may be inherent to executing multiple VM entries and VM exits. The trade-off between VM transition latency and emulation latency (and complexity) may lead to different design decisions for this mechanism on different processors.

For instance, consider the following case. Guest software reads a device status register, causing a VM exit. This step is followed in the guest by a lengthy address computation phase. If the computation is successful, the guest then performs a write access to a device command register, causing a VM exit; on a failure, the code branches to an error handler (not causing a VM exit). If profiling shows that the computation is always or nearly always successful, guest code may be rewritten to speculatively perform the address computation before issuing the status read, allowing the status read and command write instructions (both of which would cause VM exits) to be substantially adjacent. Such a modification may provide efficient emulation of the instructions in the VMM, without incurring a slowdown for emulating the address generation code in the VMM or the overhead of repeated VM entries and VM exits.

In certain embodiments of the invention, profiling is performed to determine where trap-and-modify opportunities exist. In one embodiment, the instructions following an instruction causing a VM exit may be examined to see if they would also cause VM exits. In one embodiment, the remaining instructions in the basic block may be scanned. In one embodiment of the invention, the instruction addresses of instructions causing VM exits are tracked, and only instructions frequently causing VM exits are processed for optimization using trap-and-modify techniques. In one embodiment of the invention, instruction addresses are tracked and regions of code in which VM exits display spatial locality are processed for optimization opportunities. In one embodiment of the invention, the address of the instruction causing a VM exit as well as an indication of system work performed by the processor (such as a time stamp counter or retired instruction counter) are tracked. Further analysis may be focused on areas with temporal locality as indicated by this tracking data. In one embodiment, the tracking data is processed to determine how the VMM will respond on a given VM exit. For example, if profiling reveals several VM exits which are clustered together, the VMM may associate metadata with the address of the instruction causing the VM exit or type of VM exit to indicate that when the VM exit is observed the VMM should emulate the instruction stream for the next 'n' instructions or until a specified flow exit marker is encountered. A flow exit marker may be an instruction which alters program flow, or an instruction which potentially causes a VM exit.

In certain embodiments of the invention, resources such as, for example, time, memory, or debug registers, may be used to maintain a modification to guest or monitor state. This requirement on a limited resource may limit the number of modifications which may simultaneously be active. To determine which modifications to activate at any particular time, profiling may be used to determine the effectiveness of a given modification (e.g., as measured in terms of the frequency with which it is encountered). Efficiency data may be applied to determine which modification should be removed to satisfy resource constraints.

In certain embodiments of the invention, VMM code flows may be created which carry out the operations described by a sequence of instructions in the guest.

Figure 4:
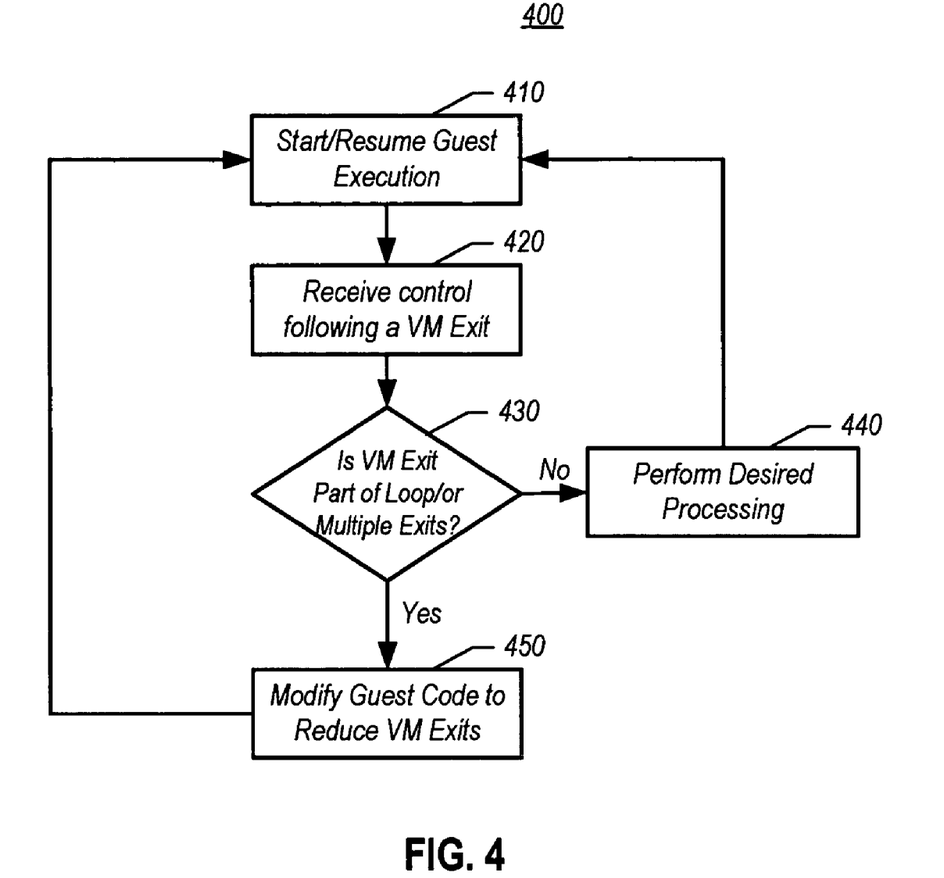
FIG. 4 is a flow diagram of a method of reducing guest software exits in accordance with an embodiment of the present invention.

In still other embodiments, guest software may be modified to reduce exits, thereby improving system behavior. Referring now to FIG. 4, shown is a flow diagram of a method of modifying guest software to reduce exits in accordance with an embodiment of the present invention. The method may be performed by a VMM, such as VMM 112 of FIG. 1.

As shown in FIG. 4, method 400 may begin by initiating execution of the guest software in a VM (block 410). During execution of the guest software, a virtualization event may cause a VM exit. Upon an occurrence of such an event, control is returned to the VMM (block 420). Then it may be determined whether the VM exit is caused by an instruction which is within a loop or is part of an instruction sequence that causes a sufficient number of VM exits in a limited number of instructions (diamond 430). The threshold for what may be considered a sufficient number of VM exits or a limited number of instructions may vary in different embodiments. In certain embodiments, if a guest code sequence causes more than several VM exits, for example, it may be desirable to modify such guest code. If it is determined that the VM exit is not caused by an instruction that is part of such a loop or multiple-exit sequence of instructions, desired processing may be performed within the VMM to handle the VM exit, if any (block 440), and control may return to the guest software for resumption of guest execution (block 410).

If alternately, it is determined at diamond 430 that the VM exit is caused by an instruction which is part of a loop or multiple-exit sequence, the guest code may be modified to reduce the number of VM exits or to change the character of the VM exits (block 450). While various manners of modifying guest code may be implemented, several examples will be discussed below. After modification of such code, control may return to block 410.

For example, in one particular embodiment, instructions that reference sensitive state locations (causing VM exits) may be written to refer to shadow locations (that do not cause VM exits), when possible. For instance, if a device has address, length and command registers, instructions that write the address and length registers may be modified to access one or more shadow locations in memory instead of accessing the actual device registers. Accesses to the shadow location(s) in memory are configured to not cause VM exits. In certain embodiments, accesses to the command register may be left unmodified so that they will cause VM exits. When a VM exit is serviced for a command register write, the VMM may write to the address and length device registers using the values stored in the shadow registers before writing the command register on behalf of the guest software. In certain such embodiments, the VMM may validate and/or modify the values to be written to the device according to its requirements.

Another trap-and-modify technique in accordance with an embodiment of the present invention may optimize behavior of guest code that modifies, using a series of operations, device or memory state that the VMM wishes to protect. Such a guest code flow may execute a number of logical operations to build a final data value that is enabled through some other mechanism. For example, a page table entry (PTE) value in memory may be constructed by guest software by first clearing the PTE (i.e., by writing a zero value to the PTE in memory), followed by the 'OR'ing of a page frame number (which writes to the PTE in memory), followed by the 'OR'ing of permission bits (again writing the memory), and so on. If the VMM is protecting the memory containing the PTE, each one of these writes to the PTE in memory will cause a VM exit. The code may be rewritten to generate the final value into a temporary register or memory location that does not cause VM exits. This final value is then written to the actual PTE in memory using a single store operation. This final write to the actual PTE in memory is configured to cause a VM exit. This is advantageous because the technique replaces a series of VM exits (on each incremental update to the PTE in memory) with a single VM exit (due to the store to the PTE in memory).

In one embodiment of the invention, a VM exit is triggered by an event (e.g., a fault or trap) which is not available to the guest software executing in the VM. For example, a VM exit may be triggered by accesses to state which normally would not cause a fault or trap in the software executing in the VM. Alternatively, the event may be similar to an existing event which is visible to the guest software, but delivered to a separate handler or with alternate associated information. For example a page fault could trigger a VM exit, but be presented to a virtualization fault handler instead of the handler installed using the architectural mechanisms configured by the guest software. The virtualization fault handler may be provided additional information not available to the guest software page fault handler.

Binary translation, as used in virtual machine environments, typically relies on doing a complete analysis of a target program, though potentially in blocks as program segments are executed (assuring that only analyzed blocks of code are executed by utilizing page table or other protections). The necessity of analyzing the entire target program is caused by the inability of the translation mechanism to regain control when accesses to state requiring translation occur. The analysis is used to modify all occurrences of instructions or instruction sequences which may access privileged state or cause privileged events. In this way the (modified) target program is assured to be "safe" to execute.

In certain embodiments, trap-and-modify techniques may, in contrast to binary translation mechanisms, analyze and modify only a portion of the guest software which may access privileged state or cause privileged events, allowing the rest of the guest software to execute unmodified and without analysis. Additionally, the analysis and modification of the target program is not required prior to execution of the target program. Not analyzing and/or modifying the target program prior to execution is possible because the trap-and-modify techniques may rely on an ability to detect accesses to privileged state not available to existing binary translation mechanisms. This is discussed further below. This feature of the trap-and-modify mechanism provides for significant improvements in system performance, while reducing the design and validation complexity of the modification (i.e., translation) mechanism.

In one embodiment a VM exit is triggered according to an alternate set of controls than is available to the guest operating system. For example, the processor ISA may provide a VMM with the ability (e.g., by setting certain execution controls) to cause VM exits from guest software on the execution of instructions or access to privileged state based on a set of controls that are not visible to the guest software. For example, the ISA may provide the ability to cause VM exits on accesses to control register state (e.g., control register zero (CR0) in the IA-32 ISA) when executed in the most privileged mode in the guest software (e.g., ring 0 in the IA-32 ISA). Guest software would have no way to prevent these accesses, nor any mechanism by which they could be directly observed. The presence of these alternate controls provide the trap-and-modify mechanism with the ability to discover all points in guest software accessing privileged resources without performing a full analysis of the guest software prior to execution of the guest software. These controls allow the trap-and-modify mechanism to be more robust across changes in the guest software (e.g., when the guest software is patched or otherwise updated), since they allow the trap-and-modify mechanism to specify conditions which require intervention as opposed to requiring knowledge of the guest software in order to, a priori, modify it appropriately. Additionally, trap-and-modify techniques can more easily be made robust in the presence of self-modifying code in the guest software.

In one embodiment of the invention, modifications to facilitate trap-and-modify techniques may be made part of a software development process for generating system code for a guest operating system. For example software generation tools such as compilers may generate code which facilitates fault-and-modify optimizations. Alternatively, programmers may implement code to be more amenable to virtualization. The software generation process can directly exploit many of the techniques previously described (such as virtualization event clustering and minimizing privileged state accesses) as well as to facilitate patching by leaving space for patching near privileged state accesses. For example, a privileged flow may be padded with a number of no operation (NOP) instructions (i.e., instructions which occupy space in the instruction steam, but otherwise make no modifications to state) to simplify modification of guest code.

Embodiments may be implemented in code and may be stored on a storage medium having stored thereon instructions which can be used to program a computer system to perform the embodiment. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   a virtual machine monitor (VMM) receiving control following a transition from a virtual machine (VM) executing guest software, wherein the transition to the VMM is caused by a control mechanism unavailable to the guest software; and
   determining whether to modify the guest software based upon a predetermined parameter;
   modifying the guest software based on the determination; and
   profiling the guest software to determine an effectiveness of the modification and removing the modification based on the profiling results.

2. The method of claim 1, wherein the modifying comprises transforming an exit type of a portion of code of the guest software.

3. The method of claim 1, wherein the modifying comprises reducing exits from the VM.

4. The method of claim 1, further comprising modifying the state of the guest software while the guest software is resident in system memory.

5. A method comprising:
   detecting a first executable instruction code portion, included in Guest Software, configured to cause an initial exit event from a virtual machine (VM) executing the guest software to a virtual machine monitor (VMM); and
   while maintaining a second portion of the guest software unmodified and unanalyzed, modifying the first portion of the guest software (a) so the initial exit event does not occur and (b) only when the first portion will cause VM exits at or beyond a predetermined frequency.

6. The method of claim 5, further comprising transitioning from the VM to the VMM based on a control mechanism unavailable to the guest software.

7. The method of claim 5, wherein the modifying comprises changing the first portion to change a cause of an exit.

8. The method of claim 5, further comprising modifying a state of the VMM executing the VM.

9. An article comprising a machine-accessible storage medium containing instructions that if executed enable a system to:
   receive control with a virtual machine monitor following a first exit event from a virtual machine executing guest software, wherein the first exit event is caused by a control mechanism unavailable to the guest software;
   determine whether to modify the guest software based upon a predetermined parameter;
   replace a first executable instruction, included in the guest software, with a second executable instruction based on the determination; and
   profile the guest software to determine an effectiveness of the second executable instruction and remove the second executable instruction based on the profile results.

10. The article of claim 9, wherein the article further comprises instructions that if executed enable the system to replace the first executable instruction with the second executable instruction that is configured to cause a second exit event having a lower latency than the first exit event.

11. The article of claim 9, wherein the article further comprises instructions that if executed enable the system to cause exits from the virtual machine to be substantially adjacent.

12. The article of claim 9, wherein the article further comprises instructions that if executed enable the system to reduce exits from the virtual machine.

13. A system comprising:
   a processor;
   a virtual machine monitor (VMM); and
   memory, coupled to the processor, including instructions that if executed enable the VMM to (a) detect a first portion of guest software, which will cause an initial exit event to occur during the execution of the guest software on the VMM, (b) modify the first portion of the guest software so the initial exit event does not occur, and (c) maintain a second portion of the guest software unmodified and unanalyzed;
   wherein the modification occurs only when the first portion will cause exit events at or beyond a predetermined frequency.

14. The system of claim 13, further comprising instructions that if executed enable the system to modify a state of the virtual machine monitor that hosts a virtual machine.

15. An apparatus comprising:
   a memory, coupled to a processor, including a virtual machine monitor having:

an event detector to detect a first portion of guest software that will cause an initial exit event when the guest software is executed on the virtual machine monitor; and a modifier to modify the first portion of the guest software and maintain unaltered and unanalyzed a second portion of the guest software;

wherein (a) the modified first portion, when executed on the virtual machine monitor, does not cause the initial exit event and (b) the modifier is configured to only modify guest software instructions that cause virtual machine exits at or beyond a predetermined frequency.

16. The apparatus of claim 15, wherein the virtual machine monitor is adapted to cause a virtual machine exit via a control mechanism unavailable to the guest software.

17. The article of claim 9, wherein the second executable instruction includes a VMCALL instruction configured to cause a second exit event having a lower latency than the first exit event.

18. The article of claim 9, wherein:
the first executable instruction is configured to produce a first number of exit events; and
the second executable instruction includes a VMCALL instruction configured to produce a second number of exit events lower than the first number of exit events.

19. The article of claim 9, wherein the first executable instruction includes an instruction to modify a page table and the second executable instruction includes a VMCALL instruction configured to cause a second exit event having a lower latency than the first exit event.

20. The method of claim 1 including determining whether to modify the guest software based upon an analysis of guest software code near a guest software code portion that caused the transition.

21. The method of claim 1 including determining whether to modify the guest software based upon an analysis of the cause of the transition.

22. The method of claim 21 including determining whether the guest software was previously modified by the VMM based on the analysis of the cause of the transition.

23. The apparatus of claim 15 including code to (a) determine whether virtual machine exit causing instructions are clustered together and (b) associate metadata with one of the virtual machine exit causing instructions; wherein the metadata indicates the virtual machine monitor should emulate a predetermined number of instructions when the respective virtual machine exit is observed.

24. The method of claim 1, wherein modifying the guest software includes creating a first code path for page table accesses and a second code path for non-page table memory accesses and modifying an instruction in the first code path to cause a VM exit.

25. The method of claim 1, wherein modifying the guest software includes modifying instructions that precede a graphics translation table memory write instruction so that an instruction that causes a VM exit includes a single memory operand format.

* * * * *